Aug. 18, 1925.
G. W. RUNDLE
1,550,049
BOLSTER FOR CHILDREN'S VEHICLES
Filed Dec. 15, 1922
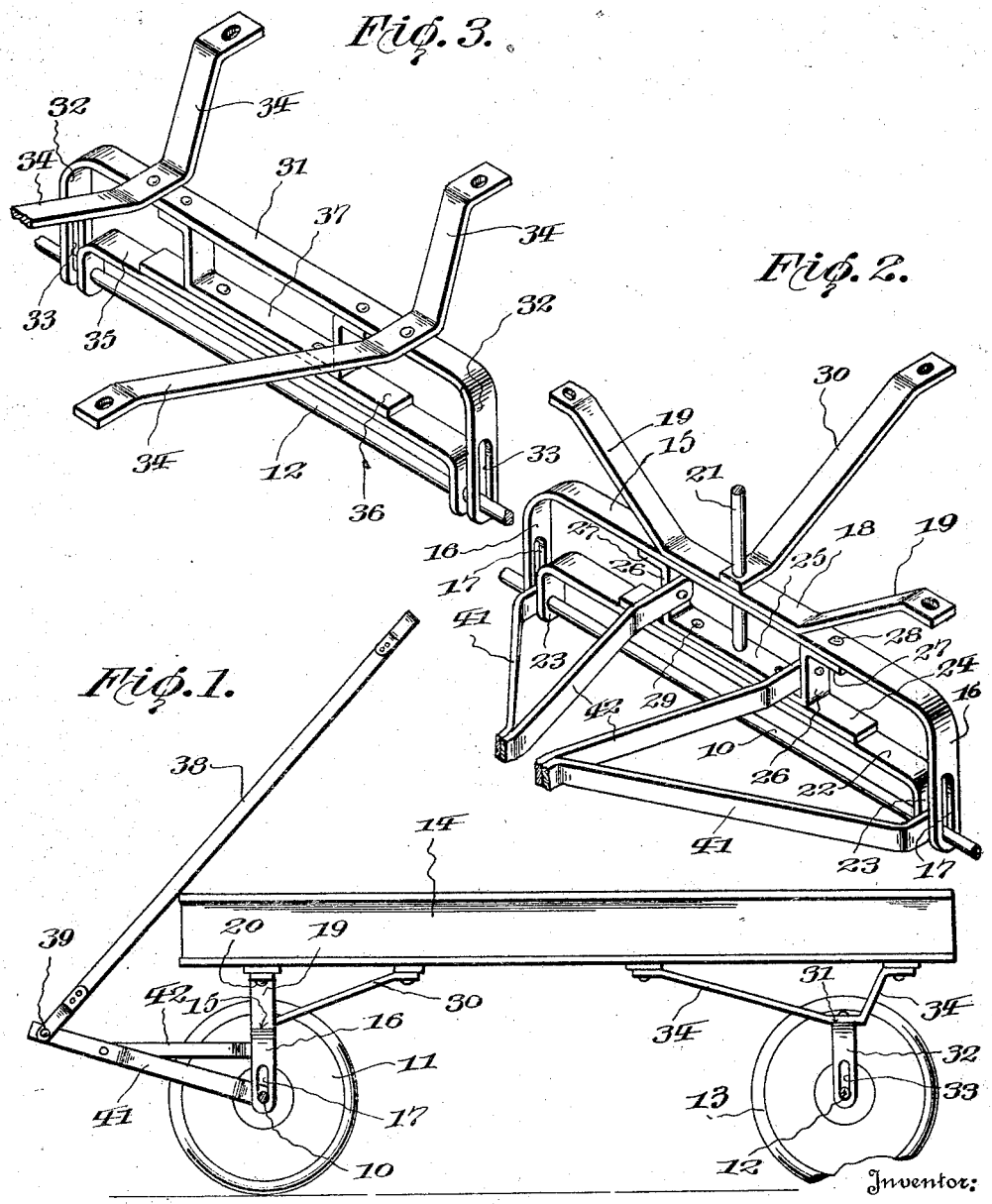
Inventor:
George W. Rundle.
By Max A. Schmidt
Attorney Patented Aug. 18, 1925.

1,550,049

UNITED STATES PATENT OFFICE.

GEORGE W. RUNDLE, OF FREMONT, OHIO.

BOLSTER FOR CHILDREN'S VEHICLES.

Application filed December 15, 1922. Serial No. 607,097.

*To all whom it may concern:*

Be it known that I, GEORGE W. RUNDLE, a citizen of the United States, residing at Fremont, in the county of Sandusky and State of Ohio, have invented certain new and useful Improvements in Bolsters for Children's Vehicles, of which the following is a specification.

This invention relates broadly to coaster wagons and similar children's vehicles, but more particularly to an improved bolster structure therefor, the object of the invention being to provide a new type of spring support for the vehicle body, and this object being attained by means of a novel and improved construction and arrangement of parts to be hereinafter described and claimed.

More specifically speaking, it is an important feature to provide a bolster wherein the spring suspension means is preferably in the form of a leaf-spring which extends substantially the full width of the body of the vehicle to provide a uniform yieldable support to prevent swaying from side to side of the body with respect to the axle.

It is also a feature of the invention to eliminate specific fastenings for the spring to the axle to overcome possibility of breakage of the ends of the axle.

In order that the invention may be better understood, reference is had to the accompanying drawings, in which—

Figure 1 is a side elevation of the vehicle with the wheels on one side removed, and Figs. 2 and 3 are perspective views of the front and rear bolsters and the parts associated therewith.

A practical embodiment of the invention has been illustrated, but it will be understood that various changes and modifications may be made without a departure from the spirit and scope of the invention as claimed hereinafter.

Referring specifically to the drawings, 10 denotes the front axle carrying the wheels 11. The rear axle and its wheels are shown at 12 and 13, respectively, and the wagon body is shown at 14.

The front axle 10 is carried by a support consisting of a flat metal bar 15 extending parallel to the axle and located above the same, with downward bends 16 at its ends provided with vertical slots 17 through which the axle loosely passes to permit relative movement of the bar and the axle.

With the axle supporting bar 15 is pivotally connected a support for the front end of the body 14, said support being a flat metal bar 18 seating on top of the bar 15, and having upturned ends 19 to which the body is bolted or otherwise secured, as shown at 20. The pivotal connection between the bars 15 and 18 is made by a king bolt 21 passing therethrough.

Between the axle 10 and the bar 15 is located a flat resilient bar 22 forming a leaf spring which extends transversely of the vehicle and has downturned ends 23 provided with apertures through which the axle passes, whereby the connection of the spring with the axle is made.

On top of the spring 22, intermediate its ends, is placed a flat bar 24 and on top of the latter seats a brace for connecting the spring to the bar 15, said brace consisting of a flat bar 25 having upturned ends 26 terminating in outwardly directed lateral bends 27 fitting the under side of the bar 15 and riveted or otherwise secured to the latter, as shown at 28. The parts 22, 24 and 25 are bolted together, as shown at 29, and the king bolt 21 also passes through the same. To the king bolt 21, above the bar 18, is connected a rearwardly extending body brace 30.

The rear axle 12 is carried by a supporting bar 31 having downward end bends 32 provided with vertical slots 33 through which the axle loosely passes. The bar 31 is connected to the body 14 by bracket members 34 secured to and depending from the latter.

Between the axle 12 and the bar 31 is interposed a spring 35 similar to the spring 22 hereinbefore described. A connection is also made between the axle supporting bar 31 and the spring 35 by means of a plate 36 and a brace 37 similar to the parts 24 and 25 hereinbefore described.

It will be evident from the foregoing that the vehicle body 14 is spring-supported at its front end by the interposition of the spring 22 between the axle 10 and the supporting bar 15, and at its rear end by the spring 35 between the axle 12 and the supporting bar 31. The construction is light, strong and durable, and the parts are capable of being easily assembled.

The vehicle is also provided with a tongue or handle 38 pivotally connected at its inner end, as shown at 39, to hounds consisting of a pair of bars 41 which are connected to the axle 10, and a second pair of bars 42 which are connected to the upturned end portions 26 of the brace 25.

I claim:

1. A vehicle bolster comprising an axle, a transversely disposed axle-supporting bar positioned above the axle and having downturned ends, the ends of said axle being slidably connected with said downturned ends to permit vertical movement of the axle with respect to said bar, means for securing the bar to the body of the vehicle, a transverse leaf-spring extending substantially the full width of the body and interposed between and having its intermediate portion spaced from the axle and bar, said spring having its ends connected to and vertically movable with said axle, and other means interposed between and having connection with the intermediate portions of the bar and spring to transmit the load to the spring when the axle moves vertically, whereby to longitudinally flex said spring to absorb the shock.

2. A vehicle bolster comprising an axle, a transverse axle-supporting bar positioned above the axle and having downturned vertically slotted end portions in which the ends of the axle loosely seat, vehicle body-supporting means carried by the axle-supporting bar, a transverse spring interposed between and spaced from said bar and axle, said spring being a resilient flat bar having downturned end portions provided with apertures through which the axle passes, and connections in the space between the axle-supporting bar and the spring intermediate the ends of the latter.

3. A vehicle bolster comprising an axle, a transversely disposed axle-supporting bar having downturned ends slidably connected to the end portions of the axle to permit relative vertical movement of the latter, a leaf-spring interposed between said bar and axle and extending substantially the full length thereof, being connected at its ends to said axle so that said ends will move upwardly with the axle, and means arranged between the intermediate portions of said bar and spring for preventing the intermediate portions of the spring from moving toward said bar, whereby when the axle and ends of the spring are moved upwardly the end portions of the spring will flex longitudinally.

4. The structure specified in claim 1, wherein said other means comprises a plate secured to the top and central part of the spring, and a substantially U-shaped brace secured to the plate and having its upturned ends secured to said bar.

In testimony whereof I affix my signature.

GEORGE W. RUNDLE.